April 9, 1935.  W. J. McGOLDRICK  1,997,262
THERMOSTATIC CONTROL
Filed Dec. 1, 1933  2 Sheets-Sheet 1

William James McGoldrick, Inventor,
Delos G. Haynes, Attorney

April 9, 1935.  W. J. McGOLDRICK  1,997,262
THERMOSTATIC CONTROL
Filed Dec. 1, 1933  2 Sheets-Sheet 2

William James McGoldrick,
Inventor,
Delos F. Haynes,
Attorney

Patented Apr. 9, 1935

1,997,262

UNITED STATES PATENT OFFICE 1,997,262

THERMOSTATIC CONTROL

William James McGoldrick, Marshfield Hills, Mass., assignor to General Plate Company, Attleboro, Mass., a corporation of Massachusetts Application December 1, 1933, Serial No. 700,411

7 Claims. (Cl. 200—139)

This invention relates to thermostatic controls, and with regard to certain more specific features, to thermostatic electric switches.

Among the several objects of the invention may be noted the provision of a thermostatic electric switch of the class described which is compact in structure and which is adapted to be applied, as a unit, to any surface the temperature of which it is desired to control; a thermostatic switch of the class described including means operating to conduct heat efficiently from the surface the temperature of which is to be controlled, to the thermostatic actuating element thereof; a switch of the class described including means for accurately adjusting the temperature at which the switch operates; a switch of the class described including improved means for transmitting the motion of the thermostatic element to the electrical contacting means; and the provision of a thermostatic electric switch of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention.

Similar reference characters indicate corresponding parts throughout the several views of the drawings.

Figure 1:
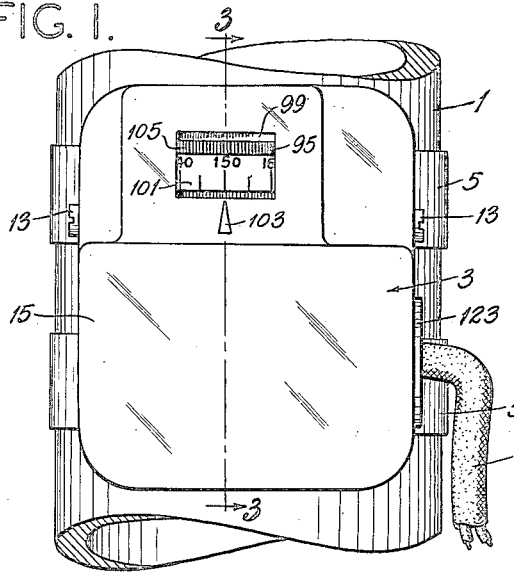
Fig. 1 is a front elevation of a thermostatic electric switch embodying the present invention, as applied to a pipe in order to be responsive to the temperature thereof.

Referring now more particularly to Fig. 1, numeral 1 indicates a pipe, which, under normal circumstances, may be considered as conducting a fluid, the temperature of which is desired to control. For example, the pipe 1 may comprise a hot water outlet, or riser, of a household hot water heating plant. Inasmuch as the pipe 1 is usually made of such material as is a good heat conductor, it will be apparent that the temperature of the surface of the pipe 1 will substantially correspond to the temperature of the fluid moving in the pipe 1. The present invention comprises a switch which is attached to the pipe 1, or any similar element, in order to be responsive to the temperature of the surface thereof, and to motivate electrical contact or switch means whereby the heat generating apparatus (for example, the oil burner) is controlled with respect to that temperature.

Numeral 3 indicates broadly the switch of the present invention. It is attached to the pipe 1, for example, by means of straps 5. An electrical cord or cable 7 entering the switch 3 provides for electrical connections to said switch.

Figure 2:
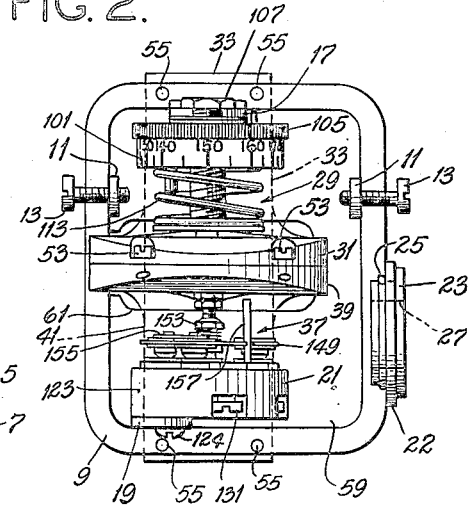
Fig. 2 is a front elevation of the switch of Fig. 1, but with a cover portion removed.

Referring also to Fig. 2, numeral 9 indicates a rectangular frame, which forms the supporting base for the various elements going to make up the switch 3. From the frame 9, at right angles to the plane thereof, extends a pair of ears or brackets 11, which receive machine screws 13. The screws 13 serve to hold in position, on the frame 9, a casing or cover member 15. The cover 15 suitably comprises molded phenolic or like insulating material.

Also extending from the frame 9, at the top thereof, is a bracket 17, while at the bottom of the frame 9 a similar bracket 19 is provided. The bracket 17 supports temperature adjusting means later to be described, while the bracket 19 supports an electrical contact plate 21, also to be described hereinafter. Also extending from the frame 9, on the outer edge thereof, is a bracket 22, which receives an insulating ring 23. The ring 23 is held in position on the bracket 22 by a wire snap ring 25. Through the central opening 27 of the ring 23 passes the conduit or cord 7.

Numeral 29 indicates an upper heat conducting, thermostatic actuator mounting element, which is preferably made of aluminum or some other metal of high heat conductivity and low heat capacity. The element 29 comprises a circular horizontal portion 31 and a relatively flat vertical portion 33. The outer face of the portion 33 is curved to fit tightly against the pipe 1, or other device upon which the switch is to be mounted, as is shown at numeral 35 in Figures 3 and 4.

Mounted in juxtaposition to the element 29 is another element 37 of similar shape and function. The element 37 also has a circular horizontal portion 39 and a vertical portion 41, the portion 41 likewise being provided with a curved surface 43 for engaging the surface of the pipe 1. The portions 35 and 43 of the respective members 29 and 37 in effect form a continuation of each other, as is apparent from Fig. 3. The central portions 31 and 39 are inwardly hollow, having conical recesses 45 and 47 respectively. Recesses 45 and 47 provide a central chamber 49 which receives a thermostatic actuating element 51 to be described hereinafter.

Screws 53 (Figures 2 and 3) hold the portions 31 and 39 together as a unit, while screws 55 hold the members 29 and 37, as an assembly, to the frame 9, spaced therefrom by heat insulating spacer blocks 57. The screws 55 also serve to support, by clamping between the blocks 57 and the frame 9, a back cover plate 59. The plate 59 is preferably formed from insulating material and has a central opening 61 therein to accommodate the circular portions 31 and 39 of the elements 29 and 37, respectively. This arrangement provides spaces 63 (Fig. 3) between the elements 29 and 37, and the plate 59, through which spaces 63 the bands 5 (Fig. 1) are passed in order to secure the switch to the pipe or the like.

Figure 5:
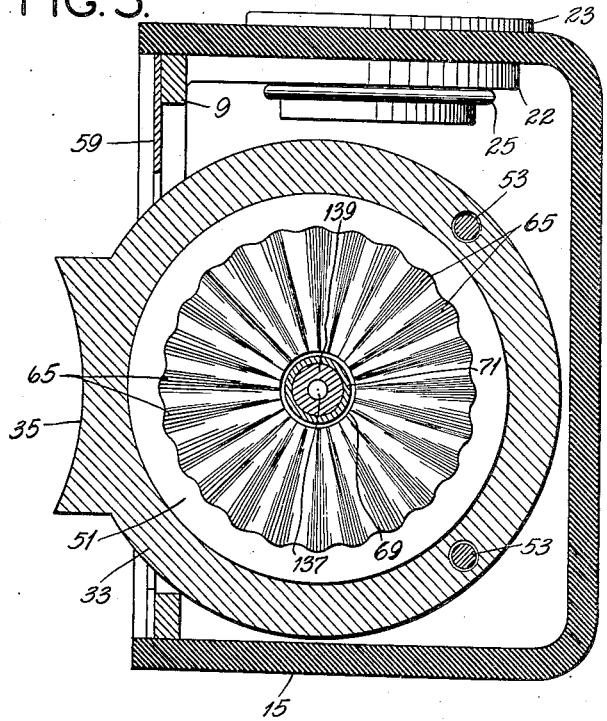
Fig. 5 is a horizontal cross-section taken substantially on lines 5—5 of Fig. 3.

In the chamber 49, there is loosely clamped, by means of the portions 31 and 39, the thermostatic actuating element 51, which comprises a composite thermostatic metal disc having radial corrugations 65 therein (see Fig. 5), but having a flat periphery 67, and a central opening 69, this actuating element being of the type shown in John A. Spencer Patent No. 1,895,591. No detailed description of this actuating element will be given herein, reference being directed to said patent therefor. However, it may be said that it comprises a bimetallic or like device which is essentially slightly conical in one direction, but which, under conditions of temperature change of a predetermined magnitude, reverses its direction of conicity with a snap action. The reversal of direction of conicity causes the central portion of the disc 51 surrounding opening 69 to move through an appreciable amplitude, and it is this motion which is used for achieving a switch control in the present invention.

The actuator 51, as has been indicated, is secured in position by loosely clamping its flat peripheral rim 67 between the two portions 31 and 39 of the elements 29 and 37.

As the elements 29 and 37 are both formed of good heat conducting material of low heat capacity, it will readily be seen that the actuator 51, through direct contact therewith, and by radiation and convection between it and the enclosing walls, is maintained at all times at substantially the temperature of the surface of the pipe 1. The manner in which the actuator 51 is shielded by its enclosure from radiation and conduction to and from objects other than the elements 29 and 37, and from external air currents, is also believed to be an important factor contributing to the unusually close correspondence of the temperature of the actuator 51 and the temperature of the surface of pipe 1.

As is disclosed in the copending patent application of John A. Spencer, Serial No. 637,854, filed October 14, 1932, now Patent No. 1,972,832, patented September 4, 1934, the temperature at which the thermostatic actuator or disc of the type herein employed snaps may be varied or adjusted by placing a variable resilient load on the central movable portion of the disc. Adjusting means in accord with this principle are embodied in the present invention. They comprise, first, a member 71 of generally cylindrical shape, which projects through a central hole 69 in the disc 51. Extending from the member 71 is a flange 73 having a downwardly directed edge 75 which bears against the upper surface of the disc 51 near the edge of the central opening 69. The member 71 extends loosely through a suitable opening 77 in the circular portion 31 of member 29, and has an end portion 79 of reduced diameter forming a shoulder 81. Seated on the shoulder 81 and freely rotatable with respect to the portion 79 is a circular plate 83, which is provided with a peripheral flange 85.

In the bracket 17 which extends from the frame 9 there is provided a slot 87 which receives a threaded member 89. The lower end of the member 89 is formed as a threaded spindle 91 of greater diameter, the threads of the spindle 91 being provided at a considerable angle. A spacer collar 93, on which is rotatably mounted a disc or dial 95 having a depending flange or apron 97, is mounted on the member 89. The disc 95 and apron 97 project forwardly through a suitable opening 99 in the casing 15. On the apron 97 there is mounted a scale 101, which includes indicia for the range of temperature variation over which it is possible to adjust the device. A cooperating arrow 103 (Fig. 1) permits adjustments to be securely effected from the front of the encased switch. The edge of the disc 99 is knurled as indicated at numeral 105 (Fig. 2) in order to permit of its ready manual rotation.

A nut 107 (Fig. 3) secures member 89 in position on the bracket 17, a washer 94 providing a surface against which the spacer collar 93 abuts. The nut 107 is so tightened that the member 89, with its spindle 91, are non-rotatable with respect to the bracket 17, but the space provided by the collar 93 permits rotation of the disc 95. In order that the disc 95 may hold its manually adjusted position until it is desired to manually adjust it to some other position corresponding to a different temperature, a spring washer 96 is provided which resists by its friction unintentional motion of the disc 95.

Threadedly engaging the spindle 91 is a nut 109, which is provided with a peripheral flange 111. The flange 111 and the flange 85 on member 83 are of the same diameter, and support therebetween a compression coil spring 113. The nut 109 also includes a radial slot 115, which receives a pin 117 mounted in the disc 95. This arrangement provides for coextensive rotation of the disc 95 and the nut 109, the spindle 91, however, remaining stationary. As the nut 109 rotates, it advances up and down the spindle 91, and thus expands or compresses the spring 113. As the spring 113 rests at its lower end on member 83, its pressure is transmitted directly to the upper surface of thermostatic actuator disc 51. By this means a variable resilient pressure may be placed upon the disc 51 by manual rotation of the disc 95 from the exterior of the switch. The indicia on the strip 101 are suitably spaced in position to indicate directly the temperature of the medium in the pipe 1 at which the disc 51 will snap, as determined by the amount of resilient pressure exerted by the spring 113 thereon.

Extending upwardly from the disc 95 is a pin 119, which, by engaging with the blind ends of suitable depressions 121 (see Fig. 4) in the bracket 17, positively limits rotation of the disc 95 in both directions.

The lead of the threads on spindle 91 is preferably made so great that the nut 109 will move substantially the entire length of said spindle 91 within the limits of rotation of the disc 95. Thus, a relatively wide variation of snapping temperatures may be achieved without an excessive amount of manual actuation.

Figure 6:
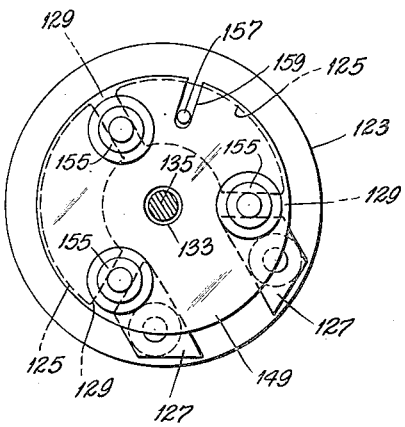
Fig. 6 is a cross-section taken substantially along lines 6—6 of Fig. 3.

The electrical switch means operated by the thermostatic actuator 51 will next be considered. Numeral 123 (Fig. 3) indicates a block of insulating material which is mounted by screws 124 on the bracket 19 extending from the frame 9. On its upper surface, the block 123 carries the stationary contact members of the switch, comprising two circular segments 125 (Fig. 6) and two terminal pieces 127. Between each of the pieces 125 and 127 there is provided a gap 129, the four pieces thus providing three gaps. The terminal pieces 127 are attached to connecting screws or binding posts 131 (Fig. 3) to which the ends of the cord or conduit 7 are attached. In order to make connections from one terminal 127 to the other terminal 127, the three gaps 129 must be bridged.

A central hole 133 in the block 123 slidably receives a pin 135. The pin 135 is threaded at its upper end 137, and thereon is screwed a ball member 139. The ball member 139 is received in a suitable recess 141 in the lower end of the cylindrical member 71 which is positioned within the central opening 69 in the disc 51. The lower ends of the member 71 are turned inwardly as indicated at numeral 143 in order to retain the ball 139. There is thus provided a ball-and-socket or universal joint between the member 71 and the pin 135. Lock nuts 145 secure the ball member 139 tightly in position on the threaded pin 137.

Also threaded on the pin 135 is a collar 147. Resting relatively loosely upon the collar 147 is a circular plate 149 preferably made of insulating material. The plate 149 is held down against the collar 147 by a compression spring 151 surrounding the pin 135, the other end of the spring 151 reacting against a nut 153 also threaded on the pin 135.

The plate 149 carries three contact buttons 155 (see also Fig. 6) thereon. The buttons 155 are formed of electrical conducting material, and desirably have one of the structures shown in John A. Spencer Patents No. 1,697,886, No. 1,718,716, and No. 1,939,286. They are positioned each to bridge one of the gaps 129 between the stationary contacts 125 and 127.

Figure 3:
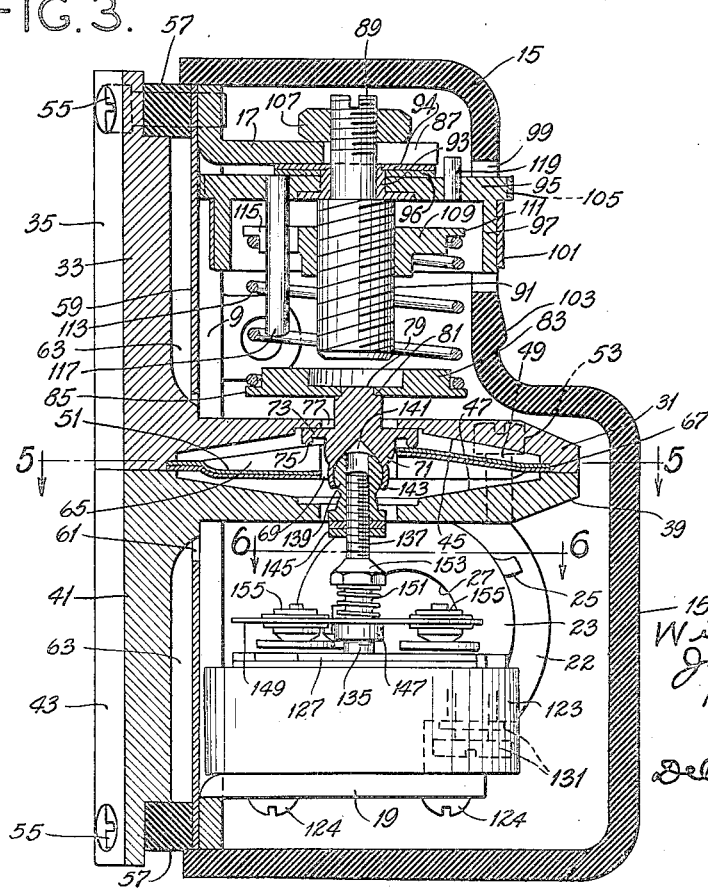
Fig. 3 is a vertical cross-section of the switch of Figures 1 and 2, taken substantially along lines 3—3 of Fig. 1.
Figure 4:
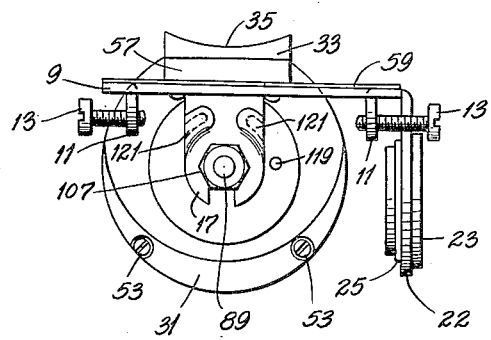
Fig. 4 is a top plan view of the switch shown in Fig. 2.

When the disc 51 is in its upwardly dished position as indicated in Fig. 3, the plate 149 is lifted high enough so that the buttons 155 are removed from contact bridging position and thus the switch is opened. However, when the disc 51 over-centers to its downwardly dished position, its motion is transmitted to the pin 135 so that the plate 149 is dropped through a sufficient distance to bridge the gaps 129 with the contact buttons 155, thus closing the switch and hence the circuit. The buttons 155 are held firmly against the stationary contacts 125 and 127 by the compression of the spring 151, the adjustment being such that when contact is effected the plate 149 is slightly lifted off the collar 147. When, now, the disc 51 again snaps to upwardly dished position, in the initial or creepage stage of its motion, no actual motion is imparted to the buttons 155, as the play provided by the collar 147 approaching the plate 149 is sufficient to take care of this creepage motion. However, when the creepage is over and the disc 51 is in the actual "snap" portion of its travel, the collar 147 engages the plate 149 to lift the contact buttons 155 and thus to break the circuit with a desired snap action.

In transmitting the snapping movement of the disc 53 to the pin 135, the ball-and-socket joint between the members 71 and 139 is very advantageous, as it compensates for any motion of the disc, or of the member 71, that is not precisely in a true vertical direction. It has been discovered that a device which is constrained to move only vertically, as would be the case were the member 71 and the pin 135 to be permanently and rigidly secured together, exerts an inhibiting effect upon the snapping movement of the disc 51 if the parts happen to be slightly misaligned. The ball-and-socket joint, on the contrary, provides for a free movement of the disc 51, without unwanted restrictions even if the parts are somewhat misaligned. Rotation of the plate or disc 149 on the pin 135 is prevented by means of an upstanding pin 157 mounted in the lock 123, which is engaged by a radial slot 159 in said plate 149.

From the above it will be seen that a highly efficient and accurate thermostatically operated electric switch has been provided, and that this switch is accurately adjustable through a considerable range of temperature variations. The compact size and structure of the device as a whole makes it possible for it to be housed in a casing considerably smaller than the casings required for prior analogous devices.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A thermostatic switch comprising a snap-acting thermostatic disc, means supporting and enclosing said disc comprising a pair of members loosely clamping the periphery of said disc therebetween, said members having extensions in planes at angles thereto, said extensions being shaped to juxtapose the surface the temperature of which it is desired to control, said members and extensions being good conductors of heat whereby said disc is heated by conduction from the said surface, stationary contact means, and movable contact means cooperating therewith, said movable contact means being operatively connected to the movable part of said disc.

2. A switch as set forth in claim 1, in which the thermostatic disc is radially corrugated.

3. A switch as set forth in claim 1, including means placing a variable resilient pressure upon the movable part of said disc, whereby to vary the temperature at which the disc snaps.

4. A switch as set forth in claim 1, including means bearing upon the movable part of said disc, a compression spring bearing upon said last-named means, and means for varying the load upon said compression spring, whereby to vary the temperature at which the disc snaps.

5. In a thermostatic control, a thermostatic actuating element comprising a radially corrugated, snap-acting thermostatic disc, means mounting said disc at the periphery thereof, and means for placing a variable resilient load on the central movable portion of said disc, said last-named means comprising an element bearing upon the central portion of said disc, a relatively stationary screw, a nut rotatable on said screw, and a compression spring between said nut and said element, and means for rotating said nut to move it up and down said screw to vary the extent of compression of said spring.

6. In a thermostatic control, a thermostatic actuating element comprising a radially corrugated, snap-acting thermostatic disc, means mounting said disc at the periphery thereof, and means for placing a variable resilient load on the central movable portion of said disc, said last-named means comprising an element bearing upon the central portion of said disc, a screw, a nut rotatable on said screw, and a compression spring between said nut and said element, and means for moving said nut up and down said screw to vary the extent of compression of said spring.

7. In a thermostatic electric switch, a thermostatic element comprising a radially corrugated, snap-acting thermostatic disc having a central opening therein, means mounting said disc at its periphery but leaving the central portion thereof free for movement in response to temperature change, means having a socket therein and passing through said central opening and movable with said disc, stationary contact means, movable contact means cooperating therewith, and means connected to said movable contact means and having a ball thereon, said ball being received by said socket, whereby a universal joint is provided between said disc and said movable contact means.

WILLIAM JAMES McGOLDRICK.